US009336356B2

(12) United States Patent
Parla et al.

(10) Patent No.: US 9,336,356 B2
(45) Date of Patent: May 10, 2016

(54) RESTRICTING NETWORK AND DEVICE ACCESS BASED ON PRESENCE DETECTION

(75) Inventors: Vincent E. Parla, North Hampton, NH (US); Eli John Gelasco, Millis, MA (US); Paul Michael Tillotson, Framingham, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 108 days.

(21) Appl. No.: 13/267,508

(22) Filed: Oct. 6, 2011

(65) Prior Publication Data
US 2013/0091537 A1 Apr. 11, 2013

(51) Int. Cl.
*H04L 29/06* (2006.01)
*G06F 21/00* (2013.01)
*H04W 12/08* (2009.01)

(52) U.S. Cl.
CPC ............ *G06F 21/00* (2013.01); *H04L 63/0272* (2013.01); *H04L 63/10* (2013.01); *H04W 12/08* (2013.01)

(58) Field of Classification Search
None
See application file for complete search history.

(56) References Cited

U.S. PATENT DOCUMENTS

| | | | | |
|---|---|---|---|---|
| 5,960,085 | A * | 9/1999 | de la Huerga | 340/5.61 |
| 6,088,450 | A * | 7/2000 | Davis et al. | 713/182 |
| 6,751,668 | B1 * | 6/2004 | Lin et al. | 709/227 |
| 7,292,843 | B2 * | 11/2007 | Ishikawa et al. | 455/411 |
| 7,674,298 | B1 * | 3/2010 | Cambridge | 726/35 |
| 8,467,768 | B2 * | 6/2013 | Mahaffey et al. | 455/411 |
| 8,551,186 | B1 * | 10/2013 | Strand | 726/35 |
| 2003/0065934 | A1 * | 4/2003 | Angelo et al. | 713/200 |
| 2003/0083044 | A1 * | 5/2003 | Schreyer et al. | 455/411 |
| 2004/0056759 | A1 * | 3/2004 | Ungs | 340/5.74 |
| 2006/0072760 | A1 * | 4/2006 | Gates | 380/270 |
| 2006/0112418 | A1 * | 5/2006 | Bantz et al. | 726/4 |
| 2008/0107274 | A1 * | 5/2008 | Worthy | 380/278 |
| 2008/0134299 | A1 * | 6/2008 | Posamentier | 726/4 |
| 2008/0186162 | A1 * | 8/2008 | Rajan et al. | 340/539.13 |
| 2012/0174237 | A1 * | 7/2012 | Krzyzanowski | 726/29 |
| 2012/0196571 | A1 * | 8/2012 | Grkov et al. | 455/411 |
| 2012/0198519 | A1 | 8/2012 | Parla et al. | |

OTHER PUBLICATIONS

Myers, Adam "Using bluetooth to lock your computer", In Windows, Apr. 19, 2010, www.howinthetech.com/using-bluetooth-to-lock-your-cmputer (3 pages).
Brunning, Jerry, "Bluetooth ScreenLock", Coding4Fun Articles, Channel 9 htt://channel9.msdn.com/coding4fun/articles/Bluetooth-ScreenLock (6 pages), downloaded on Apr. 28, 2011.
BT Watcher Pro 1.5.0 Printout: www.top4download.com/bt-watcher-pro/zvzuwjfz.html, (1 page), downloaded on Apr. 28, 2011.
BluetoothShareware.com instructions on how to "LockitNow!" www.bluetoothshareware.com/lockitnow.asp, (3 pages), downloaded on Apr. 28, 2011.

* cited by examiner

*Primary Examiner* — Minh Dinh
(74) *Attorney, Agent, or Firm* — Patterson + Sheridan (57) ABSTRACT

In an example embodiment, a technique that applies a network policy responsive to specified events, or triggers, to a networked device. If a specified event occurs, the network policy may restrict the device's access to the network. For example, if a user walks away from their networked device, such as a laptop, the device's network access changes. For example, depending upon the policy, network traffic may be blocked or otherwise restricted.

18 Claims, 4 Drawing Sheets

RESTRICTING NETWORK AND DEVICE ACCESS BASED ON PRESENCE DETECTION

TECHNICAL FIELD

The present disclosure relates generally to providing security for computing devices.

BACKGROUND

The proliferation of mobile devices has enabled users to access data, including data on secured networks, from almost anywhere. This can pose a security risk. For example, when a user leaves an endpoint device such as a personal computer (PC), laptop, or mobile phone unattended, there is a risk of unauthorized access via the unattended endpoint device.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a technique that applies a network policy responsive to specified events, or triggers, to a networked device. If a specified event occurs, the network policy may restrict the device's access to the network. For example, if a user walks away from their networked device, such as a laptop, the device's network access changes. For example, depending upon the network policy, network traffic may be blocked or otherwise restricted.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a network policy is applied to a networked device that is responsive to predefined events, or triggers, that can prevent network access by unauthorized users. For example, when a user walks away from a networked device, such as a laptop or mobile phone, (e.g., to fetch a cup of coffee), the network access on the networked device would change. In the preceding example, network access may be blocked or otherwise restricted while the user is away from the device. Another trigger, referred to herein as a release trigger, may be employed to release the network restrictions. For example, when the user returns to the computing device, network access may be restored. The network policy can prevent network access if the networked device is stolen and password security is compromised.

A variety of techniques can be used to trigger the network policy. For example, co-located sensors, such as a Radio Frequency Identification (RFID) sensor, near field communication (NFC), and/or Bluetooth transceiver may be employed to detect whether a user is in proximity of the networked device. In an example embodiment, a sensor may be built into the device natively, such as gyroscope, or a timer based on computer related activities, such as keyboard, mouse, and/or touch screen inputs. When a predefined trigger occurs, a Network Policy would be applied to the device. For example, if co-located sensors are employed, a trigger could occur when sensor was out of range of the networked device, e.g., a person is in a public place such as Starbucks™ with a laptop and leaves the networked device at the table and walks to the counter with a Bluetooth enabled phone and/or RFID tag in his/her pocket. For a device such as a gyroscope, a trigger may be based on the device's angle and/or motion, such as whether the device is laying flat on a table for a predefined interval. In an example embodiment, time base triggers may be employed, e.g., the trigger is based on a period of inactivity, similar to screensaver.

In particular embodiments, combinations of triggers may be employed. For example, if a sensor no longer detects a BLUETOOTH phone or RFID sensor within proximity of the networked device, the device may wait a predetermined amount of time, e.g., five seconds, before applying the network policy. As another example, a trigger may be based on a gyroscope detecting the networked device is lying flat and not moving and no user inputs detected before a timer expires.

There are a variety of network policies which could be applied in response to a trigger. These policies may include restricting network access, Virtual Private Network (VPN) specific activity, and/or establishing network connections for remediation. For example, restricting network access could include, but is not limited to, no egress or ingress of packets, limited egress or ingress of packets (limited access to specific addresses or range of addresses), or blocking new network session, e.g., connecting to a new web site, new File Transfer Protocol (FTP) session, etc. but existing sessions would be allowed to continue. VPN specific activity may include, but is not limited to, disconnecting or pausing the VPN session, or changing the tunnel access to remediation e.g., limit tunnel access for anti-virus (AV) updates and/or Administrative remediation and remote control (restricted or 'quarantined' network access). Establishing network connections might include employing tracking and recovery software such as PC PhoneHome™ or establishing a VPN session for the purpose of remote administrative access.

In an example embodiment, a network policy may include crypto enforcement. For example, a network device can get a key from an enterprise, for example via a VPN session, and when the device is locked down, the device uses the key to encrypt certain "data" and/or directories. The data remains encrypted until the network device reconnects to the enterprise.

In particular embodiments, time based access may be combined with a trigger. For example, if an RFID tag is not co-located with the networked device, the user of the device may be able to access some files/data for a specified time period such as eight hours before a cryptographic enforcement policy is set.

In an example embodiment, to restore full network access to the networked device there are triggers to release the network policy (also referred to herein as "release triggers"). In addition the policy for the networked device may require one or more of the release triggers. Release triggers may suitably comprise any user/device authentication technique, which for example may include, but are not limited to, presence of the sensor (e.g. the Bluetooth device or RFID tag is back in range of the networked device), user credentials (e.g., Active Directory username and password), or employing a secondary challenge such as a callback (for example sending a Personal Identification Number ("PIN") to release the network policy to a device associated with a user, or providing the user with a device that changes passwords/PINs at predetermined intervals such as RSA SECURID available from RSA Security, Inc., 20 Crosby Drive, Bedford, Mass. 01730), NFC, or any combination of the aforementioned techniques. In particular embodiments, callbacks may be received on a phone (cell, home and/or work) associated with a user, via SMS Text, IM, and/or email. In an example embodiment, a challenge response could include a PIN and/or voice recognition. In an example embodiment, a challenge may be received directly on the networked device, e.g., via email; the network policy may provide limited network access for the challenge protocol. In an example embodiment, visual recognition such as facial and/or fingerprint recognition can be employed for a release trigger. In yet another example embodiment, predefined activity such as a specific motion or a tapping the networked device in a predefined sequence can be used for a release trigger.

Upon receipt of a release trigger, a network restoration policy (or "restoration policy") may be employed to determine whether full or partial access is restored. For example, the restoration policy may restore full network access. In an example embodiment, the restoration policy may require re-authentication such as the login credentials of the device or credentials of the VPN session. In an example embodiment, the restoration policy may require credential renewal such as changing a password or a changing a PIN, e.g., as provided by a RSA SECURID token described herein supra. In particular embodiments, the restoration policy may modify the VPN session, such as for example reconnecting, connecting or resuming VPN Access. In an example embodiment, the restoration policy may remove an enforcement policy such as disconnecting a VPN session established for remediation or suspending tracking and recovery software such as PhoneHome™.

In an example embodiment, in addition to triggers, the network policy may employ location awareness for making network policy enforcement decisions. In other words there may be different policy based the device's current location such as at the associated user's home, office, or while accessing the network via an untrusted network (such as a WIFI connection at a public venue). For example a user may wear a badge, which includes an RFID tag while at work to get network access but the RFID badge would not be needed while at home. Location decisions could be based off a variety of techniques such as whether the network device is connecting via an unknown network (e.g., wireless roaming), Global Positioning System (GPS), cellular triangulation, wireless triangulation, and/or via proprietary systems such as Cisco Anyconnect TND (Trusted Network Detection), Microsoft NLA (Network Location Awareness), wireless SSID (Service Set Identifier), wireless and/or wired 802.1x authentication, and/or mapping technology, such as Google maps.

Figure 1:
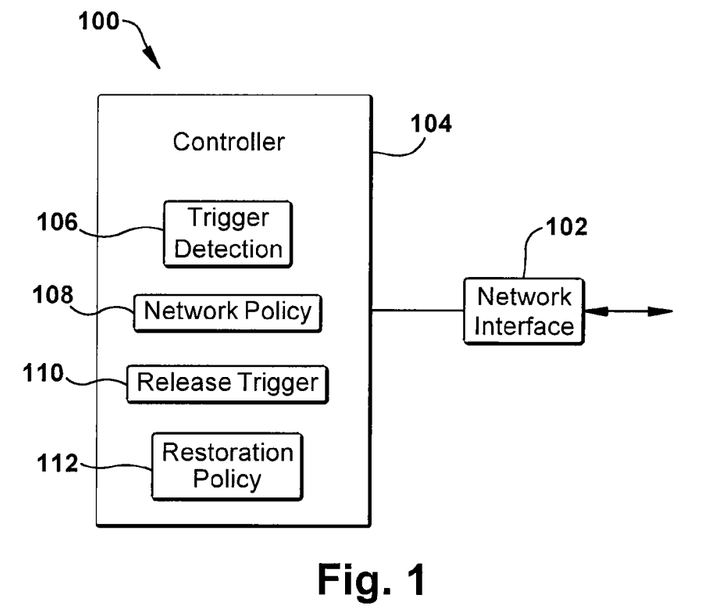
FIG. 1 is a block diagram illustrating a networking device upon which an example embodiment may be implemented.

FIG. 1 is a block diagram illustrating a networking device 100 upon which an example embodiment may be implemented. Networking device 100 comprises a network interface 102 which is capable of unidirectional or bidirectional communications with a network and controller 104 that is operable to control the operation of network interface 102. Controller 104 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. In the illustrated example, controller 104 comprises logic for implementing trigger detection 106, network policy 108, release trigger 110, and restoration policy 112.

In an example embodiment, controller 104 obtains data representative of a predefined trigger event from trigger detection module 106. Trigger detection module 106 may employ a sensor (not shown, see e.g., FIG. 2) to detect trigger events.

In an example embodiment, a trigger event is based on whether a device associated with a user is within a predefined proximity of networking device 100. For example, an RFID detector may be employed to detect a predefined RFID tag, such as an RFID badge assigned to a user associated with networked device 100. If the user walks away from networked device 100, once the user is outside of a predefined area (proximity) around networked device 100 a trigger event is detected by trigger detection module 106. In an example embodiment, a trigger event is determined by whether the RFID sensor can detect the RFID tag. In an example embodiment, NFC can be employed.

In an example embodiment, a wireless transceiver is employed to determine whether a wireless device, such as a personal digital assistant ("PDA"), cell phone, smartphone, and/or any device which may use a suitable wireless protocol such as a personal area network (PAN), for example BLUETOOTH, which may be associated with an associated user, is in proximity of networking device 100. A trigger event may occur if the device cannot be detected or if the signal strength for the device is below a specified threshold indicating the device is not within a predefined proximity of networking device 100.

In an example embodiment, a trigger event can be based on user inputs into a user interface or devices associated with a user interface such as a keyboard, mouse, and/or touchscreen. A timer (not shown, see e.g., FIG. 2) can be employed to determine whether activity has been detected on any of the user inputs and a trigger event can be based on no events being detected within a predefined interval. For example, a timer can be set to the predefined interval, each time a user input is detected the timer is reset. A trigger event occurs if the timer expires.

In an example embodiment, a sensor such as an internal gyroscope and/or accelerometer can be employed to orientation and/or detect motion of networking device 100. A trigger event can be based on the device's orientation and/or motion.

In an example embodiment, a combination of events can be employed to define a trigger event. For example, if a device is lying flat (detected by gyroscope) and/or a sensor does not detect an RFID tag and/or predefined wireless within proximity of networking device 100 causes a trigger event; whereas if the device is not lying flat and/or moving and the sensor does not detect an RFID tag and/or predefined wireless within proximity of networking device 100 does not cause a trigger event. As another example, a trigger event can be varied based on any parameter. For example, a trigger event may be based on whether a sensor detects an RFID tag and/or predefined wireless networking device. For example, a first trigger event is based on the sensor not detecting an RFID tag and/or predefined wireless device; however, if the sensor does detect an RFID tag and/or predefined wireless device, a second trigger event is based on whether user activity is detected within a predefined interval. As one skilled in the art can readily appreciate, a trigger event can be based on any combination of events.

In an example embodiment, controller 104 applies a networking policy 108 to restrict network communications by interface 102 based on the trigger event. In an example embodiment, network policy 108 employed by controller 104 blocks packet from being sent and/or received by network interface 102. In an example embodiment, network policy 108 employed by controller 104 pauses a virtual private network (VPN) session associated with network interface 102. In yet another example embodiment, network policy 108 employed by controller 104 disconnects from a VPN session associated with network interface 102. In an example embodiment, the VPN session may be limited to permitting administrative access and/or providing for anti-virus (AV) updates, and/or any other predefined functionality.

In an example embodiment, network policy 108 provides limited access via network interface 102. For example, ingress and/or egress of packets may be limited to specific addresses or ranges of addresses. In particular embodiments, network policy 108 may prohibit the establishing of new sessions such as connecting to a new website or initiating a new FTP session while allowing existing sessions to continue.

In an example embodiment, network policy 108 applied by controller 104 comprises establishing a session for remediation. For example, network policy 108 may include executing tracking and recovery software. As another example, network policy 108 may establish a VPN tunnel via network interface 102 to allow an administrator access to networking device 100. Yet another example, network policy 102 may establish a connection via network interface 102 to allow an administrator to remotely control networking device 100.

In an example embodiment, network policy 108 comprises a file access policy. For example certain files and/or directories may be encrypted upon determining a trigger event occurred. The files may be encrypted with a pre-established key, a key generated by network policy 108, and/or a key may be obtained via network interface 102. As another example, a file access policy may comprise a process policy that gives certain processes access to certain files or directories. As yet another example, the file access policy may provide granular access, such as certain file rights to certain processes.

In an example embodiment, controller 104 obtains data representative of a release trigger being detected from release trigger module 110. In particular embodiments, network policy 108 may require more than one release trigger. Release triggers may include, but are not limited to, presence of the sensor (e.g. a wireless device or RFID tag is back in range of the networked device), user credentials (e.g., Active Directory credentials), or employing a secondary challenge such as a callback (for example sending a Personal Identification Number ("PIN") to release the network policy to a device associated with a user, or providing the user with a device that changes passwords/PINs at predetermined intervals like RSA SECURID described herein supra. In particular embodiments, callbacks may be received on a phone (cell, home and/or work) associated with a user, via SMS Text, IM, and/or email. In an example embodiment, a challenge response could include a PIN and/or voice recognition. In an example embodiment, a challenge may be received directly on the networked device, e.g., via email; the network policy may provide limited network access for the challenge protocol. In an example embodiment, release trigger module 110 may employ visual recognition such as facial and/or fingerprint recognition for a release trigger. In yet another example embodiment, predefined activity such as a specific motion or tapping the networked device in a predefined sequence can be used for a release trigger.

In response to receiving data representative of a release trigger, controller 104 may employ a restoration policy 112. In an example embodiment, the restoration policy 112 may restore full network access. In another example embodiment, the restoration policy 112 may require re-authentication such as the login credentials of the device, login credentials to the network, such as Active Directory, Unix credentials, or any AAA (Authentication, Authorization, and Accounting) credentials, etc. or credentials of the VPN session. In yet another example embodiment, the restoration policy 112 may require credential renewal such as changing a password or a changing a PIN, e.g., as provided by a RSA SECURID token described herein supra. In particular embodiments, the restoration policy 112 may modify the VPN session, such as for example reconnecting, connecting or resuming VPN Access. In an example embodiment, the restoration policy 112 may remove an enforcement policy such as disconnecting a VPN session established for remediation or suspending tracking and recovery software such as PhoneHome™.

In an example embodiment, in addition to triggers, the controller 104 may employ location awareness data for making network policy enforcement decisions. In other words there may be different policy based on the device's current location such as whether networking device 100 is located at an associated user's home, office, or while accessing an enterprise network via an untrusted network (such as a WIFI connection at Starbucks). For example a user may wear a badge, which includes an RFID tag while at work to get network access but the RFID badge would not be needed while at home. However, while at home, the user may be restricted as to which websites may be accessed and/or access may be restricted until a VPN is established with an enterprise network. As another example, if the user is at the office and the RFID badge and/or wireless device move out of range of a sensor, network access may not be restricted for a predetermined amount of time, whereas network access may be restricted immediately if connected through an untrusted network (e.g., via the local Starbucks™ or McDonalds™).

Location decisions could be based off a variety of techniques such as whether the network device is connecting via an unknown network (e.g., wireless roaming), Global Positioning System (GPS), cellular triangulation, wireless triangulation, and/or via proprietary systems such as Cisco Anyconnect TND (Trusted Network Detection), Microsoft NLA (Network Location Awareness), wireless SSID (Service Set Identifier), wireless and/or wired 802.1x authentication, and/or mapping technology, such as Google maps.

Figure 2:
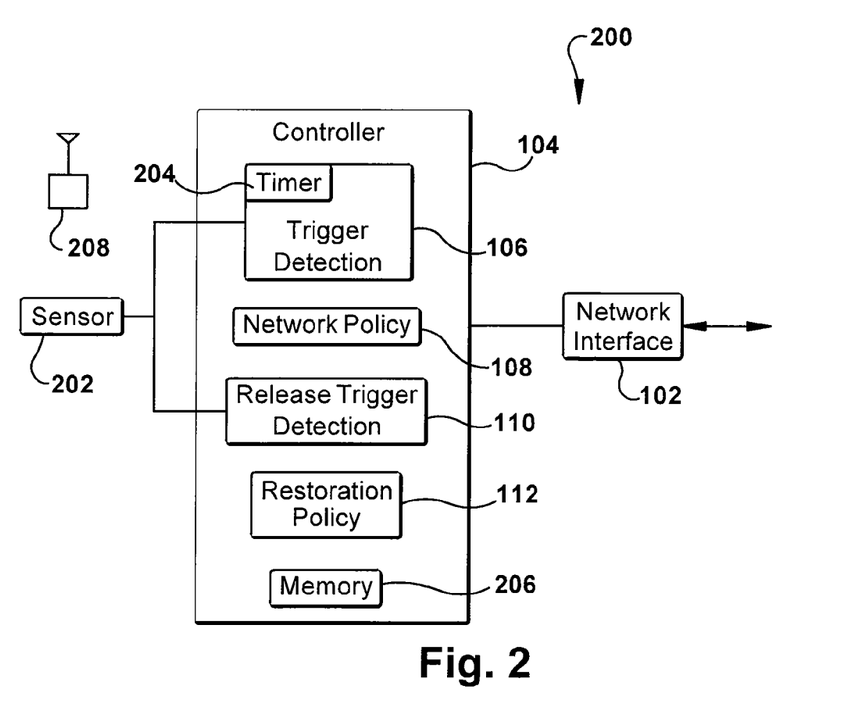
FIG. 2 is a block diagram illustrating a networking device with a sensor.

FIG. 2 is a block diagram illustrating a networked device 200 with a sensor 202. In an example embodiment, a trigger event is based on whether a device associated with a user is within a predefined proximity of networked device 200. For example, sensor 202 may comprise an RFID detector to detect a predefined RFID tag, such as an RFID badge assigned to a user associated with networked device 200. If the user walks away from networked device 200, once the user is outside of a predefined area (proximity) around networked device 200 a trigger event is detected by trigger detection module 106.

In an example embodiment, sensor 202 comprises a wireless transceiver to determine whether a wireless device, such as a personal digital assistant ("PDA"), cell phone, smartphone, and/or any other suitable device which may use a suitable wireless protocol such as a personal area network (PAN), for example BLUETOOTH, which may be associated with an associated user, is in proximity of networked device 200. A trigger event may occur if the device cannot be detected or if the signal strength for the device is below a specified threshold indicating the device is not within a predefined proximity of networked device 200.

In an example embodiment, sensor 202 comprises a user interface or devices associated with a user interface such as a keyboard, mouse, and/or touchscreen. A timer 204 can be employed to determine whether activity has been detected on any of the user inputs and a trigger event can be based on no events being detected within a predefined interval. For example, a timer can be set to the predefined interval, each time a user input is detected the timer is reset. A trigger event occurs if the timer expires.

In an example embodiment, sensor 202 comprises an internal gyroscope and/or accelerometer to determine orientation and/or detect motion of networking device 200. A trigger event can be based on the device's orientation and/or motion.

In an example embodiment, sensor 202 is coupled with release trigger module 110. For example, sensor 202 may indicate that an RFID tag and/or wireless device has returned within proximity of the networked device 200. In an example embodiment, sensor 202 may suitably comprise hardware and/or software for performing voice recognition. In an example embodiment, sensor 202 comprises a visual input so that trigger module 110 may employ visual recognition such as facial and/or fingerprint recognition for a release trigger. In yet another example embodiment, sensor 202 can detect predefined activity such as a specific motion or a tapping the networked device in a predefined sequence can be used for a release trigger.

In an example embodiment, networked device 200 further comprises a memory 206. Memory 206 may be any suitable type of memory device. In response to a trigger event, network policy 108 may suitably comprise encrypting data in memory 206. The data may remain encrypted until restoration policy 112 is implemented.

In the example illustrated in FIG. 2, a user device 208 is employed by sensor 202 to determine if an associated user is within proximity of networked device 200. In an example embodiment, the user device 208 is an RFID tagged badge such as an employee badge. In another example embodiment, the user device is a wireless device compatible with a predefined protocol such as BLUETOOTH or WIFI (802.11). If sensor loses communications with user device 208, then trigger detection 106 determines that a trigger event has occurred and controller 104 implements network policy 108 for networked device 200. Examples of suitable wireless devices include but are not limited to PDAs, smartphones, cell phones, etc.

Figure 3:
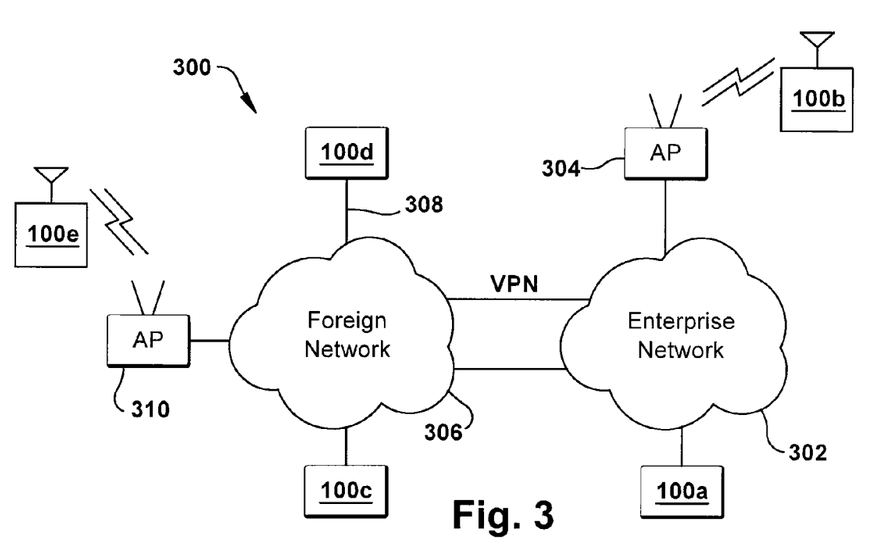
FIG. 3 is a block diagram of a network illustrating examples of networked devices coupled to an enterprise network.

FIG. 3 is a block diagram of a network 300 illustrating examples of networked devices coupled to an enterprise network 302. FIG. 3 illustrates how different security policies may be applied based on the location or type of connection to the enterprise network 302.

For example, networked device 100a is directly connected via a wired connection to enterprise network 302, for example enterprise network 302 may be a local area network (LAN) for an office. While an employee is at the office, the employee may be directly connected with enterprise network 302 similar to networked device 100a. In this example, an employee badge (not shown, see e.g., user device 208 in FIG. 2) with an RFID tag may be employed for the trigger and restoration trigger. IF networked device 100a loses communication with the RFID tag in the employee's badge, a network policy restricting network access is invoked. For example, packets to/from the network may be blocked and/or networked device 100a does not allow any new sessions while the network policy is in effect. When networked device 100a again detects the RFID tag in the employee's badge, the restoration policy may be invoked. Since the employee is at the office, which can be considered a fairly secure environment, restoration of communications may commence upon detecting the employee's badge is within proximity of networked device 100a.

Networked device 100b is coupled to enterprise network 302 wirelessly via an access point (AP) 304. Similar triggers and policies as applied to networked device 100a may be employed. In addition, networked device 100b can authenticate with AP 304. A failure to authenticate may be considered a trigger event which can invoke a network policy. For example, if networked device 100b is unable to authenticate AP 304, ingress and egress packets may be blocked. The restoration trigger may be based on successfully authenticating with an AP coupled with enterprise network 302.

Networked device 100c illustrates an example of an endpoint device coupled to enterprise network 302 through a foreign network 306. Foreign network 306 may be a trusted or untrusted network that can also be used as a parameter for the appropriate network policy to employ in determining an appropriate response to a trigger event. For example, networked device 100c may be an employee (not shown) connecting to enterprise network from home. In this example, since the employee is at home, the employee may or may not be wearing their employee badge so another device such as a wireless device associated with the employee may be employed for determining the proximity of the employee to networked device 100c. If the employee's wireless device (e.g., smartphone, cell phone, and/or PDA) is not detected, this can trigger a network policy. In addition, since the employee may not carry device with them while at home, a timer may also be employed as a trigger. If the timer determines that there has been no user activity on a keyboard, mouse and/or touchscreen interface associated with networked device 100c for longer than a predefined interval, a network policy can be invoked. Moreover, since networked device 100c is coupled at a remote site, the restoration trigger may further comprise having the employee log into enterprise network 302 again.

Networked device 100d is coupled to enterprise network 302 via foreign network 306 and employs a VPN connection 308 to communicate with enterprise network 302. In this example, network policy may further include pausing or disconnecting VPN connection 308. The restoration policy may further include restarting VPN connection 308. The user may be required to re-log in and/or enter a new PIN.

Networked device 100e illustrates an example of a networked device that is coupled wirelessly with an AP 310 coupled to a foreign network 306 for communicating with enterprise network 302. Because 100e is coupled wirelessly through a foreign (for example an untrusted) network, stricter security may be employed. For example, a trigger event may be defined when the received signal strength goes below a predefined threshold, which may be lower than the threshold defined for networked device 100a. Moreover, once the network policy has been implemented, the restoration policy may further require logging in or providing a new PIN. If a gyroscope in network device 100e detects the device is moving and the associated user's wireless device is not detected and/or not within a predefined proximity, network device 100e may encrypt certain data on the device and/or invoke security and recovery software.

The preceding examples are provided to illustrate how different triggers, network policies, restoration triggers, and restoration policies may be employed depending upon the location and/or type of connection a networked device may employ. These examples are provided for illustration only and should not be construed as limiting as one skilled in the art can readily appreciate that the same triggers, network policies, restoration triggers, and restoration policies may be employed for all devices or connections, and/or any combination of triggers, network policies, restoration triggers, and restoration policies may be applied.

Figure 4:
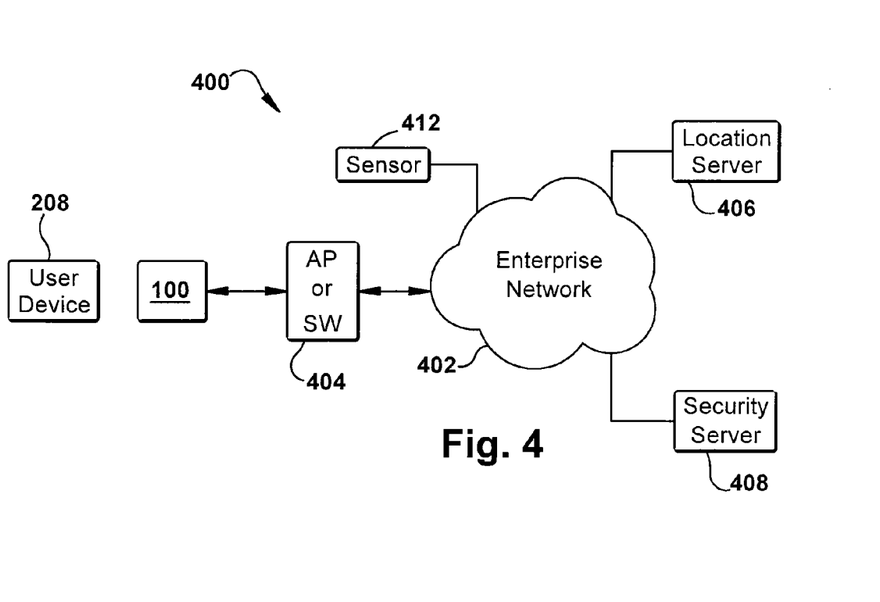
FIG. 4 is a block diagram illustrating an example of a network that employs a server for restricting network access of a networking device based on presence.

FIG. 4 is a block diagram illustrating an example of a network 400 that employs a server for restricting network access of a networking device 100 based on presence. In other example embodiments (not shown), other types of infrastructure devices such as switches, access points, etc. suitably comprise the functionality described herein for restricting network access. In the illustrated example, enterprise network 402 employs an access device 404 such as a switch or AP for communicating with a networked device 100. In the illustrated example, a user device 208 is employed to determine the proximity of an associated user with networked device 100. Location server 406 is employed to determine the proximity of user device 208 with networked device 100. Security server 408 is employed to detect trigger events, apply network policies, detect restoration triggers, and implement restoration policies as described herein. Although location server 406 and security server 408 are illustrated as separate entities, those skilled in the art should readily appreciate that this is just to illustrate their functionality and that location server 406 and security server 408 may be co-located within the same device (not shown).

In particular embodiments, a sensor 412 is employed to detect the location of networked device 100 and user device 208. Sensor may employ any suitable means for determining the location of user device 208 and networked device 100 such as RFID detection, received signal strength indication (RSSI), angle of arrival (AOA), BSSID, triangulation, etc. For example, at a workplace, RFID detectors may be placed at various locations, indicating the location of a user badge. As another example, the BSSID that a WIFI compatible device is coupled with can determine whether the user device 208 is in proximity of the networked device 100.

In an example embodiment, location server 406 determines the proximity of the user device 208 with the networked device 100. In particular embodiments, the location server 406 may receive GPS data from networked device 100 and/or user device 208. A trigger event is detected if the user device 208 is outside of a predefined range from the networked device 100. Upon detection of the trigger event, security server 408 implements a network policy. The security server 408 may communicate with access device 404 to implement the network policy. For example, the security server 408 may instruct access device 404 to block all ingress and egress packets to networked device 100. Security server may also pause or suspend a VPN connection with networked device 100. In an example embodiment, the security server 408 may allow a remediation connection with networked device 100 such as a network administrator employing remote control software. In an example embodiment, If location server 406 determines that networked device 100 is moving while user device 208 is not within proximity of the networked device 100 (potentially indicating theft), the security server 408 may send instructions to the networked device 100 instructing the networked device 100 to encrypt and/or erase data from memory.

The security server 408 maintains the security policy until a restoration trigger (.e.g., user device 208 is within a predefined proximity of networked device 100) is detected. The security server 408 would then implement the appropriate restoration policy. For example, the restoration policy may include having the user re-log in, provide a new PIN, provide biometric data, etc.

Figure 5:
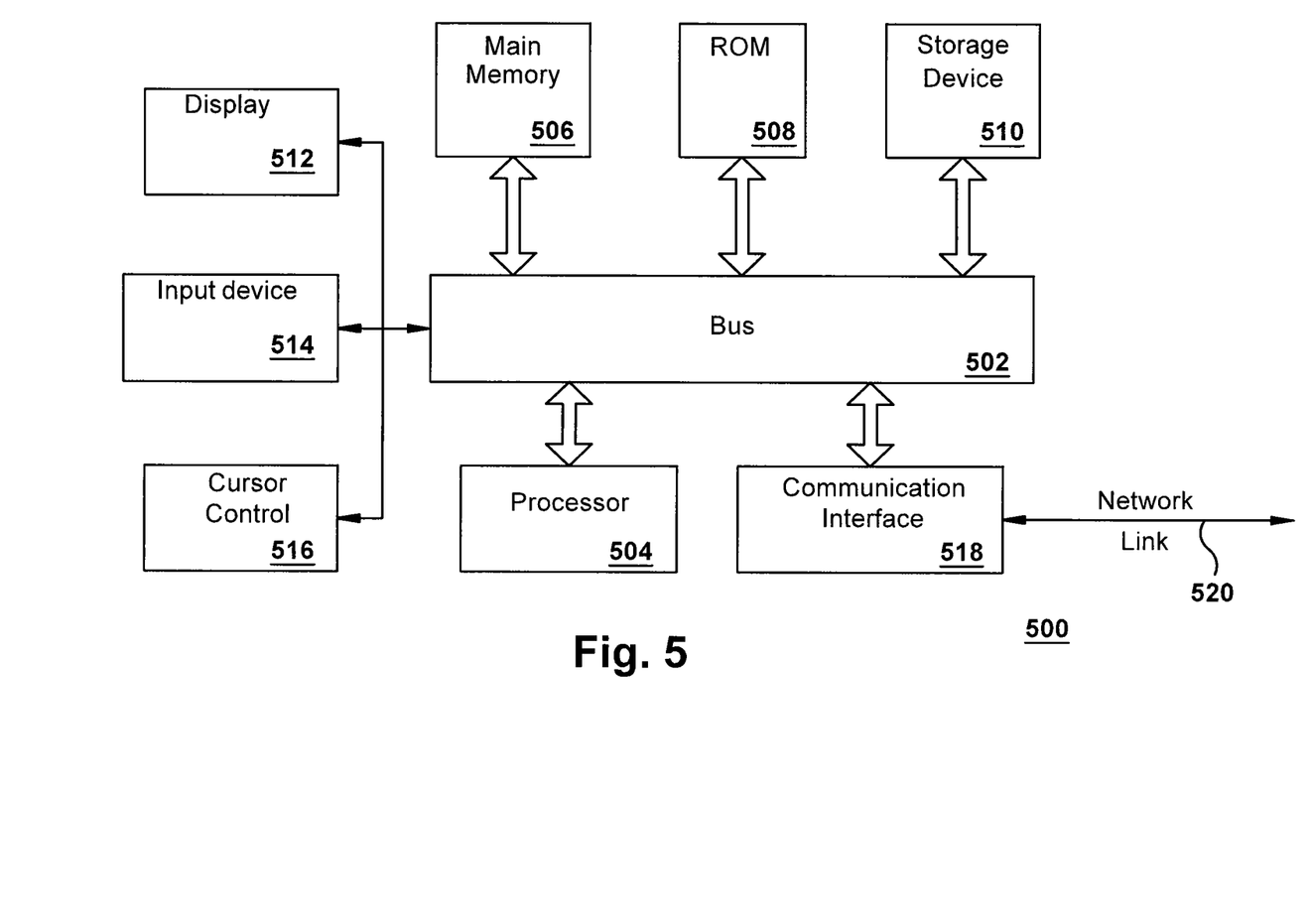
FIG. 5 is a block diagram of a computer system upon which an example embodiment may be implemented.

FIG. 5 is a block diagram that illustrates a computer system 500 upon which an example embodiment may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 such as a cathode ray tube (CRT) or liquid crystal display (LCD), for displaying information to a computer user. An input device 514, such as a keyboard and/or including alphanumeric and other keys is coupled to bus 502 for communicating information and command selections to processor 504. Another type of user input device is cursor control 516, such as a mouse, a trackball, cursor direction keys, and/or a touchscreen for communicating direction information and command selections to processor 504 and for controlling cursor movement on display 512. This input device typically has two degrees of freedom in two axes, a first axis (e.g. x) and a second axis (e.g. y) that allows the device to specify positions in a plane.

An aspect of the example embodiment is related to the use of computer system 500 for restricting network access and device access based on presence detection. According to an example embodiment, restricting network access and device access based on presence detection is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes a communication interface 518 coupled to bus 502. Communication interface 518 provides a two-way data communication coupling computer system 500 to a network link 520. This allows processor 504 to receive data, such as presence data. For example, communication link 518 may be employed to detect an RFID tag and/or a wireless device.

Figure 6:
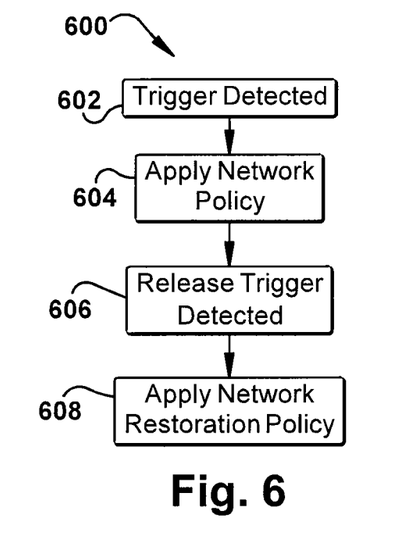
FIG. 6 is a block diagram of a methodology for restricting network access based on presence detection.
Figure 7:
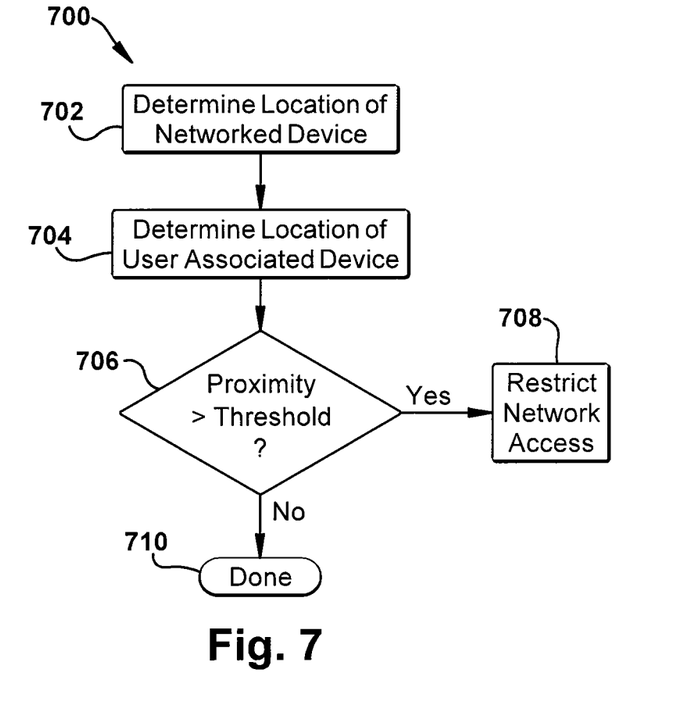
FIG. 7 is a block diagram of a methodology for restricting network access performed by a device associated with a network.

In view of the foregoing structural and functional features described above, methodologies in accordance with example embodiments will be better appreciated with reference to FIGS. 6 and 7. While, for purposes of simplicity of explanation, the methodologies of FIGS. 6 and 7 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

FIG. 6 is a block diagram of a methodology 600 for restricting network access based on presence detection. In this example, a networked device determines whether to restrict its access to an associated network.

At 602, a trigger event is detected. Any suitable event can be defined as a trigger. For example, co-located sensors, such as a Radio Frequency Identification (RFID) sensor, NFC and/or Bluetooth transceiver may be employed to detect whether a user is in proximity of the networked device. In an example embodiment, a sensor may be built into the device natively, such as gyroscope, or a timer based on computer related activities, such as keyboard, mouse, and/or touch screen inputs. For example, if co-located sensors are employed, a trigger could occur when sensor was out of range of the networked device, e.g., a person is in a public place such as Starbucks™ with a laptop and leaves the networked device at the table and walks to the counter with a Bluetooth enabled phone and/or RFID tag in his/her pocket. For a device such as a gyroscope, a trigger may be based on the device's angle and/or motion, such as whether the device is laying flat on a table for a predefined interval. In an example embodiment, time base triggers may be employed, e.g., the trigger is based on a period of inactivity, similar to screensaver.

In particular embodiments, combinations of triggers may be employed. For example, if a sensor no longer detects a BLUETOOTH phone or RFID sensor within proximity of the networked device, the device may be wait a predetermined amount of time, e.g., five seconds, before applying the network policy. As another example, a trigger may be based on a gyroscope detecting the networked device is lying flat and not moving and no user inputs detected before a timer expires.

At 604, a network policy is invoked in response to the trigger event. The policy may include, but is not limited to, restricting network access, Virtual Private Network (VPN) specific activity, and/or establishing network connections for remediation. For example, restricting network access could include, but is not limited to, no egress or ingress of packets, limited egress or ingress of packets (limited access to specific addresses or range of addresses), or blocking new network session, e.g., connecting to a new web site, new File Transfer Protocol (FTP) session, etc., but existing sessions would be allowed to continue. VPN specific activity may include, but is not limited to, disconnecting or pausing the VPN session, or changing the tunnel access to remediation e.g., limit tunnel access for anti-virus (AV) updates and/or Administrative remediation and remote control (restricted or 'quarantined' network access). Establishing network connections might include employing tracking and recovery software such as PC PhoneHome™ or establishing a VPN session for the purpose of remote administrative access.

In an example embodiment, a network policy may include crypto enforcement. For example, a network device can get a key from an enterprise via a VPN session and when the device is locked down, the device uses the key to encrypt certain "data" and/or directories. The data remains encrypted until the network device reconnects to the enterprise.

At 606, a release trigger is detected. In an example embodiment, the release trigger may employ any suitable user and/or device authentication technique. In an example embodiment, a networked device may require multiple release triggers. Release triggers may include, but are not limited to, presence of the sensor (e.g., the Bluetooth device or RFID tag is back in range of the networked device), NFC, receipt of user credentials such as an Active Directory username/password combination, or employing a secondary challenge such as a callback (for example sending a Personal Identification Number ("PIN")) to release the network policy to a device associated with a user, or providing the user with a device that changes passwords/PINs at predetermined intervals. In particular embodiments, callbacks may be received on a phone (cell, home and/or work) associated with a user, via SMS Text, IM, and/or email. In an example embodiment, a challenge response could include a PIN and/or voice recognition. In an example embodiment, a challenge may be received directly on the networked device, e.g., via email; the network policy may provide limited network access for the challenge protocol. In an example embodiment, visual recognition such as facial and/or fingerprint recognition can be employed for a release trigger. In yet another example embodiment, predefined activity such as a specific motion or a tapping the networked device in a predefined sequence can be used for a release trigger.

Upon receipt of a release trigger, at 608, a restoration policy is employed to determine whether full or partial access is restored. For example, the restoration policy may restore full network access. In an example embodiment, the restoration policy may require re-authentication such as the login credentials of the device or credentials of the VPN session. In an example embodiment, the restoration policy may require credential renewal such as changing a password or changing a PIN. In particular embodiments, the restoration policy may modify the VPN session, such as for example reconnecting, connecting or resuming VPN Access. In an example embodiment, the restoration policy may remove an enforcement policy such as disconnecting a VPN session established for remediation or suspending tracking and recovery software such as PhoneHome™.

FIG. 7 is a block diagram of a methodology 700 for restricting network access performed by a device associated with a network. Methodology 700 may be employed by a network for restricting a device's access at the device's point of attachment to the network.

At 702, the location of a networked device is determined. The location may be determined by any suitable means including, but not limited to, whether the network device is connecting via an unknown network (e.g., wireless roaming), Global Positioning System (GPS), cellular triangulation, wireless triangulation, wireless SSID wireless and/or wired 802.1x authentication, and/or mapping technology, such as Google maps.

At 704, the location of a device associated with a user is determined. The technique for determining the location may be any of the techniques listed above. The technique for locating the device associated with the user does not need to be the same as the technique used for determining the location of the networked device. In an example embodiment, a sensor may be employed by the networked device to determine whether the device associated with the user is within a predefined proximity of the networked device.

At 706, a determination is made whether the device associated with the user is within a predefined proximity (threshold) of the networked device. Any suitable threshold may be applied and may be user configurable, for example within six feet.

If at 706, a determination is made that the device associated with the user is not within a predefined proximity of the networked device (YES), network access is restricted at 708. For example, restricting network access could include, but is not limited to, no egress or ingress of packets, limited egress or ingress of packets (limited access to specific addresses or range of addresses), or blocking new network session, e.g., connecting to a new web site, new File Transfer Protocol (FTP) session, etc. but existing sessions would be allowed to continue. VPN specific activity may include, but is not limited to, disconnecting or pausing the VPN session, or changing the tunnel access to remediation e.g., limiting tunnel access for anti-virus (AV) updates and/or Administrative remediation and remote control (restricted or 'quarantined' network access). Establishing network connections might include employing tracking and recovery software such as PC PhoneHome™ or establishing a VPN session for the purpose of remote administrative access.

In an example embodiment, a network policy may include crypto enforcement. For example, a network device can get a key from an enterprise via a VPN session and when the device is locked down, the device uses the key to encrypt certain "data" and/or directories. The data remains encrypted until the network device reconnects to the enterprise.

If at 706, a determination is made that the distance between the device associated with the user and the networked device is not greater than a predefined threshold (NO), then no further action needs to be taken as indicated by 710. Methodology 700 may be implemented as often as desired, for example methodology 700 may be repeated at periodic or aperiodic intervals, or may be continuously implemented.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface for communicating with an associated network; and
a controller coupled with the interface;
wherein the controller obtains data representative of a location of the apparatus;
wherein the controller obtains data representative of a location of a user associated device, wherein the location of the user associated device comprises one of a geographical location and a network location;
wherein the controller determines a first proximity of the apparatus with the user associated device;
wherein the controller obtains data representative of a predefined trigger event, the predefined trigger event comprising the first proximity of the apparatus with the user associated device exceeding a predetermined threshold;
wherein the controller selects a network policy in accordance with the location of the apparatus;
wherein the controller, in response to the predefined trigger event, applies the selected network policy to restrict communication with the associated network via the interface;
wherein the controller obtains data representative of a plurality of release triggers, the plurality of release triggers comprising a first release trigger responsive to the user associated device returning to within a predefined proximity of the apparatus, and a second release trigger comprising the controller receiving a predefined response to a secondary challenge issued by the controller; and
wherein the controller applies a network restoration policy responsive to obtaining the data representative of the plurality of release triggers and wherein network restoration policy restores access to the associated network via the interface.

2. The apparatus of claim 1, further comprising a sensor for detecting the user associated device returning to within the predefined proximity of the apparatus as a predefined trigger event.

3. The apparatus of claim 2, wherein the sensor is a radio frequency identification transceiver and the trigger event is based on whether a predefined radio frequency identification tag is within a predefined proximity of the sensor.

4. The apparatus of claim 2, wherein the sensor is a wireless transceiver and the trigger event is based on whether a predefined wireless device is within a predefined proximity of the wireless transceiver.

5. The apparatus of claim 1, wherein the network policy comprises blocking packets from the network.

6. The apparatus of claim 1, wherein the network policy comprises preventing packets from being sent to the network.

7. The apparatus of claim 1, wherein the network policy comprises pausing a virtual private network session.

8. The apparatus of claim 1, wherein the network policy comprises disconnecting a virtual private network session.

9. The apparatus of claim 1, wherein the network policy comprises establishing a session for remediation.

10. The apparatus of claim 1, wherein the network policy comprises encrypting data stored on the apparatus.

11. The apparatus of claim 1, wherein the secondary challenge of the second release trigger comprises the controller obtaining data representative of facial recognition associated with a predefined user.

12. The apparatus of claim 1, wherein the secondary challenge of the second release trigger comprises the controller identifying a fingerprint associated with a predefined user.

13. The apparatus of claim 1, wherein the secondary challenge of the second release trigger comprises the controller identifying a voice associated with a predefined user.

14. The apparatus of claim 1, wherein the network restoration policy is selected from a group consisting of restoring full access to the network, providing a logon to the network, reconnecting a virtual private network session, and credential renewal.

15. A method, comprising:
   determining a location of a networked device associated with a user;
   determining a location of a user associated device associated with the user, wherein the location comprises one of a geographical location or a network location;
   determining the proximity of the networked device with the user associated device;
   selecting a network policy in accordance with the location of the networked device;
   restricting access to an associated network in accordance with the selected network policy responsive to the proximity of the networked device with the user associated device exceeding a predetermined threshold;
   determining an updated location of the user associated device;
   determining the proximity of the networked device with the user associated device based on the updated location; and
   restoring access to the network responsive to: i) determining the proximity of the networked device with a user associated device does not exceed a predetermined threshold, and ii) receiving a predefined response to a secondary challenge.

16. The method of claim 15, wherein restricting access to the network comprises one of a group consisting of blocking packets from the networked device and preventing packets from being sent to the networked device.

17. The method of claim 15, wherein the user associated device is selected from a group consisting of a radio frequency identification tag and a wireless device employing a predefined communication protocol.

18. Logic encoded in a non-transitory computer readable media for execution by a processor, and when executed by the processor, operable to perform an operation, the operation comprising:
   determining a location of a networked device associated with a user;
   determining a location of a user associated device associated with the user, wherein the location comprises one of a geographical location or a network location;
   determining the proximity of the networked device with the user associated device;
   selecting a network policy in accordance with the location of the networked device;
   restricting access to an associated network in accordance with the selected network policy responsive to the proximity of the networked device with the user associated device exceeding a predetermined threshold;
   determining an updated location of the user associated device;
   determining the proximity of the networked device with the user associated device based on the updated location; and
   restoring access to the network responsive to: i) determining the proximity of the networked device with a user associated device does not exceed a predetermined threshold, and ii) receiving a predefined response to a secondary challenge.

\* \* \* \* \*